(12) United States Patent
Frantzen (10) Patent No.: US 6,935,026 B2
(45) Date of Patent: Aug. 30, 2005

(54) WHEEL BEARING ASSEMBLY FOR MOTOR VEHICLES

(75) Inventor: Michael Johannes Frantzen, Aachen (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 17 days.

(21) Appl. No.: 10/272,162

(22) Filed: Oct. 15, 2002

(65) Prior Publication Data

US 2003/0115755 A1 Jun. 26, 2003

(30) Foreign Application Priority Data

Oct. 12, 2001 (DE) .......................................... 101 50 613

(51) Int. Cl.$^7$ ............................. B21K 1/02; B23P 17/00
(52) U.S. Cl. ............................... 29/898.07; 29/898.09; 29/725; 29/509; 29/521; 407/13; 407/14; 409/243; 409/244; 409/287; 72/370.13; 72/469; 384/439
(58) Field of Search .................... 29/898.06, 898.061, 29/898.062, 898.064, 898.07, 898.09, 513, 515, 521, 724, 725, 451, 407.05, 509, 894.361; 407/13, 14, 16, 18; 409/243, 244, 269, 287; 81/463; 72/370.13, 372, 469, 180; 384/439

(56) References Cited

U.S. PATENT DOCUMENTS

| | | | | |
|---|---|---|---|---|
| 2,025,223 A | * | 12/1935 | Watson | .......................... 285/189 |
| 2,138,404 A | * | 11/1938 | Haas | ............................. 29/509 |
| 2,881,646 A | * | 4/1959 | Farr et al. | ................... 29/243.5 |
| 2,906,005 A | * | 9/1959 | Harris | ...................... 29/898.07 |
| 3,318,645 A | * | 5/1967 | Sutowski | ..................... 384/505 |
| 3,444,606 A | * | 5/1969 | Jones | .................... 29/243.517 |
| 3,956,801 A | * | 5/1976 | Wood | ........................... 29/725 |
| 4,095,327 A | * | 6/1978 | Hartmann | ..................... 29/509 |
| 4,125,298 A | * | 11/1978 | Heurich et al. | ............. 384/537 |
| 4,574,448 A | | 3/1986 | Brandenstein et al. | |
| 4,587,833 A | * | 5/1986 | Speakman | ................. 72/466.8 |
| 4,869,651 A | * | 9/1989 | Shimizu et al. | ............. 417/269 |
| 5,111,575 A | * | 5/1992 | Grunze et al. | ................ 29/725 |
| 5,490,732 A | | 2/1996 | Hofmann et al. | |
| 6,105,251 A | | 8/2000 | Payen | |
| 6,129,455 A | * | 10/2000 | Galante | ....................... 384/537 |

FOREIGN PATENT DOCUMENTS

| | | |
|---|---|---|
| GB | 1276476 | 6/1972 |
| GB | 2270546 | 3/1994 |
| GB | 2351534 | 1/2001 |
| GB | 2358227 | 7/2001 |
| JP | 2000211309 A | 8/2000 |

* cited by examiner

*Primary Examiner*—Eric Compton
(74) *Attorney, Agent, or Firm*—Brinks Hofer Gilson & Lione (57) ABSTRACT

The invention relates to a wheel bearing assembly for motor vehicles with a bearing provided with an inner ring and an outer ring, the bearing being fitted with its outer ring into a bearing casing and the outer ring being mechanically supported in axial direction on a first side by a supporting surface provided on the bearing casing. Discrete and preferably evenly arranged stop protrusions are formed on the inner circumference of the bearing casing, the outer ring abutting thereon in axial direction on its second side, and the stop protrusions being formed by locally plastic forming the bearing casing.

17 Claims, 7 Drawing Sheets

WHEEL BEARING ASSEMBLY FOR MOTOR VEHICLES

BACKGROUND OF THE INVENTION

1. Field of the Invention

The subject matter of the present invention is a wheel bearing assembly for motor vehicles and a method for manufacturing such a wheel bearing assembly.

2. Description of Related Art

Such wheel bearings are comprised of a bearing, a rolling contact bearing for example, with an inner ring and an outer ring. With its outer ring, the bearing is fitted into a casing. In order to ensure proper operation of the wheel bearing assembly, the outer ring of the bearing assembly must be fixed within the casing. According to prior art, the bearing assembly is press-fitted within the casing in the simplest case. In spite of this press-fit connection, axial clearance of the bearing within the casing is still possible.

DE 199 29 536 C1 discloses an arrangement for axially fixating the ring of a bearing by means of an annular fixation element. Said fixation element is divided into several sections around the circumference, said sections form-fittingly engaging into corresponding recesses provided on the inner circumference of the bearing casing. Recesses are also provided on the outer ring of the bearing, said recesses allowing the sections to undergo deformation, which is needed for locking. The disadvantage of this construction is that the recesses on the inner circumference of the bearing casing make it more difficult to manufacture the bearing casing. Furthermore, it is not possible to use standardized normal bearings because of the recesses required on the outer ring of the bearing.

To further fasten the outer ring of the bearing within the casing, it is known to dispose a snap ring on the second side of the bearing, said snap ring being capable of supporting the outer ring of the bearing. However, this requires an additional machining step, which precludes low cost industrial scale production. Furthermore, the retention force of such a snap ring is limited.

DE 341 8440A1 discloses a wheel bearing assembly with positive connection of two engaged ring portions. The inner ring of a ball bearing is thereby formed by two parts that are slid into each other. To fasten the outer ring portion onto the inner ring portion in axial direction, the outer ring portion is supported on one side by a shoulder of the inner ring portion. On the second side, an annular projection is provided on the inner ring portion, said projection being flanged in a subsequent working step, thus forming a bearing surface on the second side of the outer ring portion which supports the outer ring portion. However, particular precautionary measures must be taken so that but small mechanical forces are allowed to act onto the outer ring portion while the flange of the projection is being formed in order to prevent the outer ring portion from being deformed, which would reduce the mechanical durability of the bearing. Furthermore, to flange the projection, either the tool or the workpiece must be rotated. Finally, during the manufacturing process of the bearing casing, the thin-walled, plastically deformable projection must be additionally molded with a special constriction to form the flange, which makes production technically more complicated.

It is therefore the object of the present invention to indicate a wheel bearing assembly comprising a casing and a bearing fitted therein, said bearing being fixed on either side within the casing, that does not require a complicated configuration of the bearing casing and/or additional, technically complicated machining steps. Concurrently, a method for manufacturing a wheel bearing assembly in accordance with the invention having technical advantages over the prior art methods is proposed.

The solution to this object is a wheel bearing assembly for motor vehicles according to the present invention and a method of manufacturing such a wheel bearing assembly for motor vehicles.

BRIEF SUMMARY OF THE INVENTION

The wheel bearing assembly for motor vehicles of the invention is comprised of a bearing provided with an inner ring and an outer ring. With its outer ring, the bearing is fitted within a bearing casing. On one side, the outer ring is thereby mechanically supported in axial direction by a supporting surface provided on the bearing casing. In accordance with the invention, at least 3 discrete stop protrusions, which are preferably placed at regular intervals on the inner circumference of the bearing casing, are realized, the outer ring resting with its second side on said stop protrusions in axial direction. Said stop protrusions are realized by locally plastically deforming the bearing casing.

Particular advantages are achieved when the bearing is press fit into the bearing casing, since press-fitting provides a relatively firm seat of the bearing within the casing and the mechanical stability of the stop protrusions may be reduced as a result thereof.

Further advantages are achieved when the bearing casing of the wheel bearing assembly is configured to form a cast part, made of gray cast iron for example. On one side, a molded casing can be manufactured on a large scale at low cost, on the other it is provided, thanks to its metallurgy, with optimal mechanical properties both for achieving a good fit between casing and bearing and for plastic forming the casing in accordance with the invention.

Alternatively, the bearing casing may also be a turned part or be manufactured by any other technique. The material and the concrete construction of the wheel bearing assembly do not matter as far as the invention is concerned.

In configuring the supporting surface of the casing to form a shoulder, a particularly simple geometrical configuration of the casing may be realized which provides advantages in the manufacturing process of the casing.

The method of manufacturing a wheel bearing assembly for motor vehicles in accordance with the invention involves the following steps:

a) fitting the bearing into the bearing casing,
b) displacing the bearing in axial direction until the outer ring abuts on the supporting surface, and
c) fixing the outer ring in the bearing casing in axial direction by machine-shaping the bearing casing by means of a broaching tool, the inner surface of the bearing casing being locally deformed by locally plastic forming it in such a manner that the stop protrusions are realized on the second side of the outer ring on the inner circumference of the bearing casing, said stop protrusions cooperating with the supporting surface to fixate the outer ring in axial direction within the bearing casing.

The method in accordance with the invention is particularly easy to utilize for serial production on a large scale when all of the stop protrusions are realized substantially simultaneously during machine-shaping according to c). This may be realized in that the broaching tool locally machines the bearing casing at several locations at the same time, by providing it with several local removing or embossing teeth for example.

The method may be even further simplified when, during the machine-shaping process, the bearing casing and the broaching tool execute a relative motion which is substantially a motion of translation only.

The advantages mentioned may be realized by means of a method in which the machine-shaping process is carried out by means of a broaching tool locally removing material. On at least 3 discrete machining areas distributed over the inner circumference of the bearing casing, material of the bearing casing is displaced in axial direction toward the second side of the outer ring, which results in locally plastic forming the bearing casing in axial direction, and more specifically in radial direction as well, and in the realization of the stop protrusions.

Using a specially configured broaching tool that locally removes material, it is furthermore possible to perform the method steps b) and c) in one single working cycle. In this case, the broaching tool is configured in such a manner that it has, on one side, punches intended to abut on a front face of the bearing so that the broaching tool is suited for use as a tool for axially displacing the bearing according to b). On the other side, it is locally provided with forming tools so that the machine-shaping process according to c) is carried out in one working step together with axial displacement.

The broaching tool described in the previous paragraph can be configured either in such a manner that the punches intended to abut on a front face of the bearing are rigidly connected to the local forming tools or in such a manner that there is no such rigid connection. In the latter case, the broaching tool consists of at least two parts which can be displaced in axial direction relative to each other. One part, an outer area for example, forms local forming tools, while another part, an inner area for example, is provided with the punches intended to abut on a front face of the bearing. Inner and outer area are preferably concentric. The inner area serves to press the bearing in with high, measured and controlled force, which is achieved by exerting a pressure onto the outer ring of the bearing. The outer area serves to machine-shape in a controlled manner.

Alternatively, at least 3 bores may be realized for the machine-shaping process within the bearing casing, said bores being located on a common circumference including the inner circumference of the casing and extending in axial direction. During the machine-shaping process, material of the bearing casing is locally displaced inward in axial direction toward the second side of the outer ring by means of a broaching tool engaging into the bores, thus forming the stop protrusions.

Finally, another advantageous alternative is to pierce into the bearing casing at least one annular hole enclosing the inner circumference of the bearing casing and extending in axial direction. The hole can be pierced during manufacturing of the casing, or it can be pierced later on in the already finished casing by means of a subsequent machining step for example. After the bearing is fitted according to the method steps a) and b), material of the bearing casing is locally displaced in radial direction toward the second side of the outer ring in at least 3 discrete machining areas distributed over the hole by means of a broaching tool engaging in said hole and (relatively) moved in axial direction, thus forming the stop protrusions. The broaching tool may also be configured in such a manner that material of the bearing casing is displaced over the entire circumference, i.e. 360 degrees.

The bearing is preferably pressed into the bearing casing by exerting pressure onto the outer ring of the bearing only.

Further advantages and characteristics of the wheel bearing assembly for motor vehicles of the invention and of the method of the invention will become apparent in the subordinate claims and in the description of the following exemplary embodiments that are not limiting the scope of the invention and are explained with reference to the drawing.

BRIEF DESCRIPTION OF THE DRAWINGS

FIG. 1b is an end view of the embodiment of the wheel bearing assembly seen in FIG. 1a;

FIGS. 2a and 2b are sectional view of partially assembled wheel bearing assembly and a broaching tool and serve to explain the method steps for manufacturing the wheel bearing assembly seen in FIG. 1a;

DETAILED DESCRIPTION OF THE INVENTION

Figure 1A:
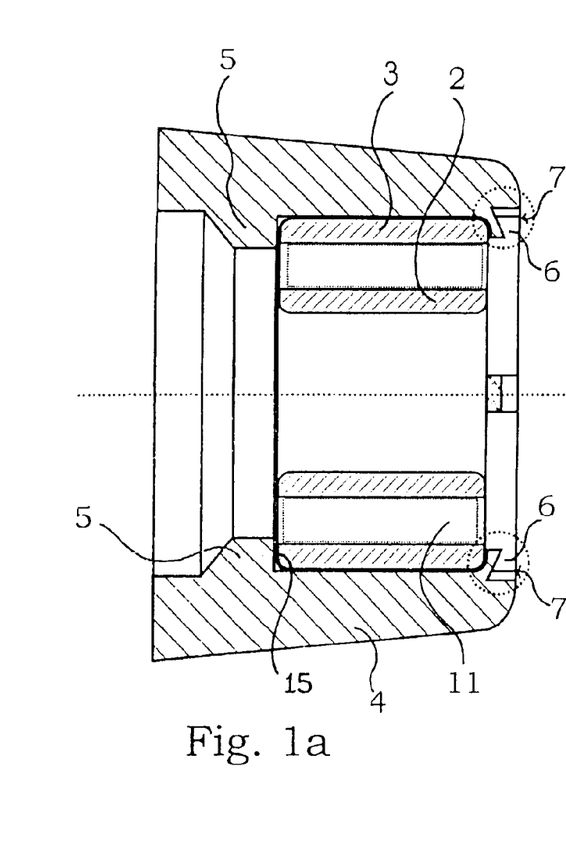
FIG. 1a is a sectional view taken along line A—A (FIG. 1b) through a first embodiment of a wheel bearing assembly according to the present invention.
Figure 1B:
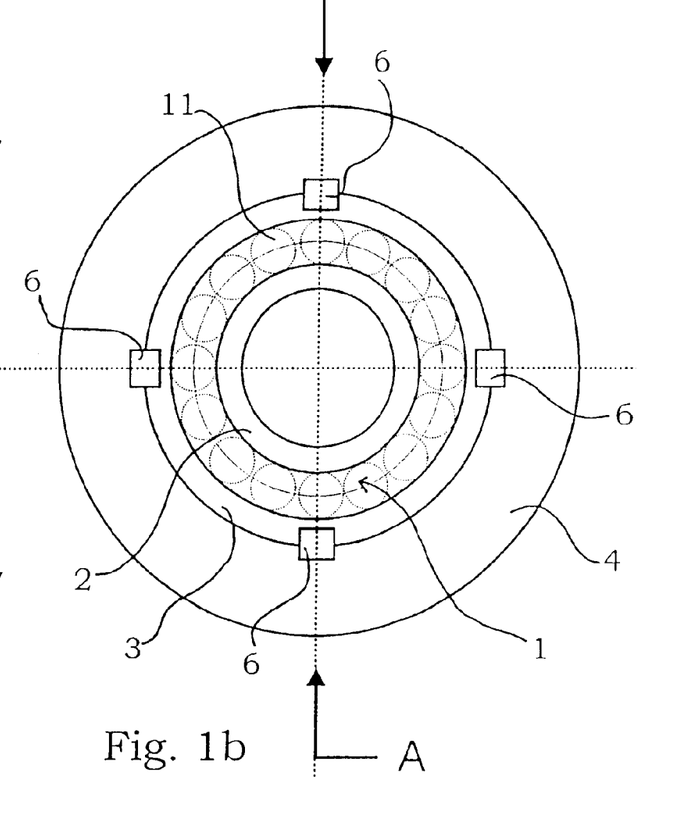

The FIGS. 1a and 1b are sectional and end views, respectively, of a first exemplary embodiment of a wheel bearing assembly for motor vehicles in accordance with the invention. FIG. 1a is a sectional view of the wheel bearing assembly taken along line A—A of FIG. 1b. The wheel bearing assembly of the invention consists of a bearing casing 4 made from gray cast iron. A bearing 1 is fitted in said bearing casing 4 with its outer ring 3. Bearing 1 may be a rolling contact bearing with rolling elements 11 configured to form cylindrical rollers. Said rolling elements 11 are illustrated in FIG. 1b, they are denoted as a dotted rectangle in FIG. 1a. They are also denoted as a dotted rectangle in the FIGS. 2a, 2b, 5a, 5b, 6b, 7a, 7b and 8b.

For fitting bearing 1, the inner circumference of bearing casing 4 is machined down in a preparation step or otherwise formed with an inner diameter for the purpose of providing a fit between bearing casing 4 and outer ring 3 of bearing 1, permitting press-fitting of the bearing 1 into bearing casing 4.

On its inner circumference, bearing casing 4 forms a support 5 configured to form a shoulder that supports bearing 1 by its outer ring 3 on a first side. During the fitting process of bearing 1 into bearing casing 4, bearing 1 is displaced in controlled manner toward support 5, the fitting procedure being terminated when outer ring 3 of bearing 1 abuts on a surface 15 of support 5. This can be achieved by ascertaining the force needed for fitting for example, since a strong increase in the displacement force required is indicative of outer ring 3 abutting on supporting surface 5.

Now, bearing 1 is fixed in bearing casing 4 by configuring several discrete stop protrusions 6 thereof adjacent to the second side of outer ring 3. In the first exemplary embodiment shown in the FIGS. 1a and 1b, said stop protrusions 6 are formed by locally removing metal and machine-shaping bearing casing 4 in the region of its inner circumference. For this purpose a broaching tool 10 is utilized which locally displaces material from the inner circumference of bearing casing 4 toward second side of the outer ring 3 of bearing casing 1 by means of several machining teeth 12. With such a controlled machine-shaping of bearing casing 4 by means of the broaching tool 10, the plastically formed material can be displaced toward the second side of outer ring 3 of bearing 1, the stop protrusions 6 needed to axially fixate bearing 1 being realized in the process. In the first exemplary embodiment shown, the formed material takes on the shape of small projections protruding inward beyond the diameter of outer ring 3, thus fixating outer ring 3 of bearing 1 in axial direction.

During the necessary plastic forming process by means of the broaching tool 10, it is important that the forces exerted onto the outer ring 3 during the machine-shaping of the material of bearing casing 4 toward the outer ring 3 of bearing 1 are not so high that they could cause the outer ring 3 to deform. The tolerances of bearing 1 could be modified as a result thereof, which would affect the durability of the wheel bearing assembly of the invention.

Figure 2A:
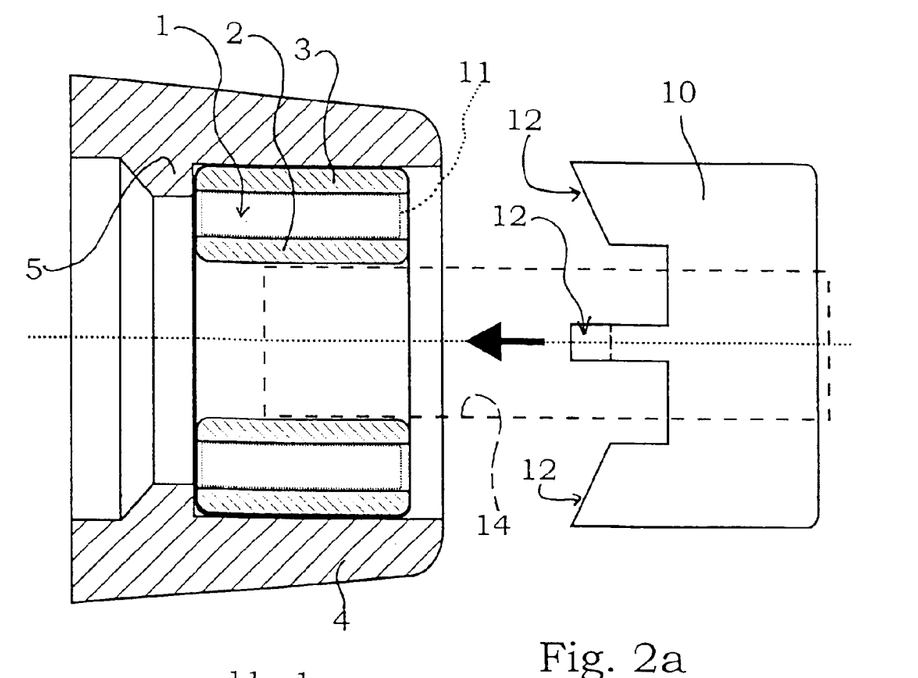
Figure 2B:
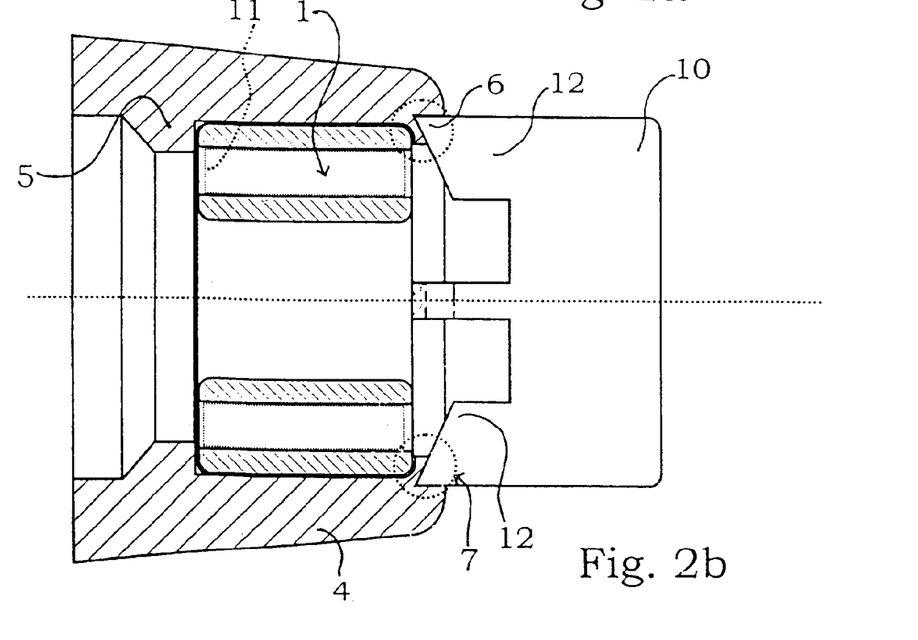

The FIGS. 2a and 2b show a manufacturing process suited to manufacture the wheel bearing assembly in accordance with the first exemplary embodiment. FIG. 2a is a sectional view of a wheel bearing assembly according to FIG. 1b, the bearing 1 being already fitted within bearing casing 4 and displaced toward the support 5. In the subsequent processing step, the broaching tool 10 is positioned co-axial with the symmetry axis of the wheel bearing unit and is moved in axial direction (see arrow) toward the outer ring 3 of bearing 1. During this movement, the broaching tool locally forms, with its machining teeth 12, the material of bearing casing 4 in the region of its inner circumference. The axial movement of the broaching tool 10 is carried on until the material has been machined locally in such a manner that it is displaced from the inner circumference of bearing casing 4 toward the outer ring 3, thus forming the stop protrusions 6, in the four machining regions 7 (dotted circles) in which the machining teeth 12 of broaching tool 10 are engaged. This final state in which the axial movement of the broaching tool 10 stops, can be surveyed from FIG. 2b. Now, the broaching tool 10 can be removed from engagement and the wheel bearing assembly of the invention is ready to be mounted.

A guide member 14 is also shown in a dashed line in FIG. 2a. It is not necessary, but advantageous and permits the tool 10 to be moved coaxially along the wheel bearing unit. The guide member 14 is configured to resemble a cylindrical mandrel, is inserted in the interior space of bearing 1 and touches the interior surface of inner ring 2. It protrudes to the right where it guides the tool 10 which is provided with an inner guide bore adapted to guide member 14.

Figure 3A:
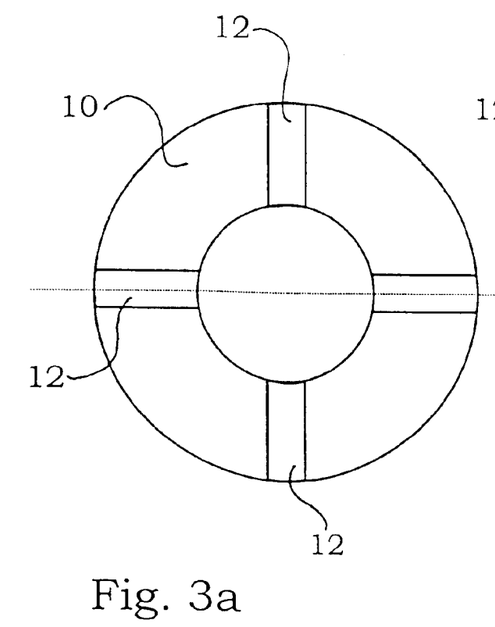
FIGS. 3a and 3b are an end view and a side view of a first broaching tool for carrying out the method steps of the present invention.
Figure 3B:
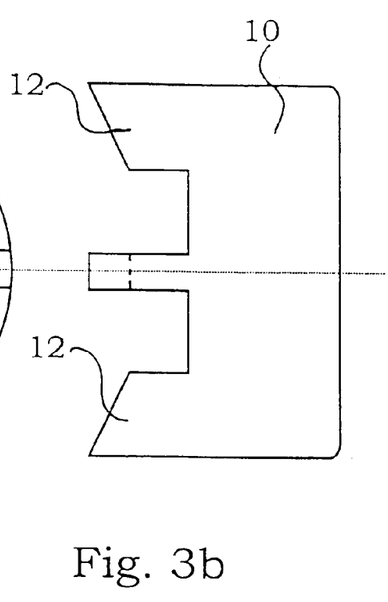

The FIGS. 3a and 3b illustrate a broaching tool 10 suited for carrying out the method of manufacturing a wheel bearing assembly according to the first exemplary embodiment described herein above. The four symmetrically arranged machining teeth 12 are shown clearly in this figure. Thanks to their largely identical configuration, the stop protrusions 6 are realized virtually simultaneously during the broaching procedure. The machining teeth 12 are advantageously hardened in an effort to provide them with a high stability for the purposes of a serial production of the wheel bearing assembly in accordance with the invention.

Figures 4A, 4B:
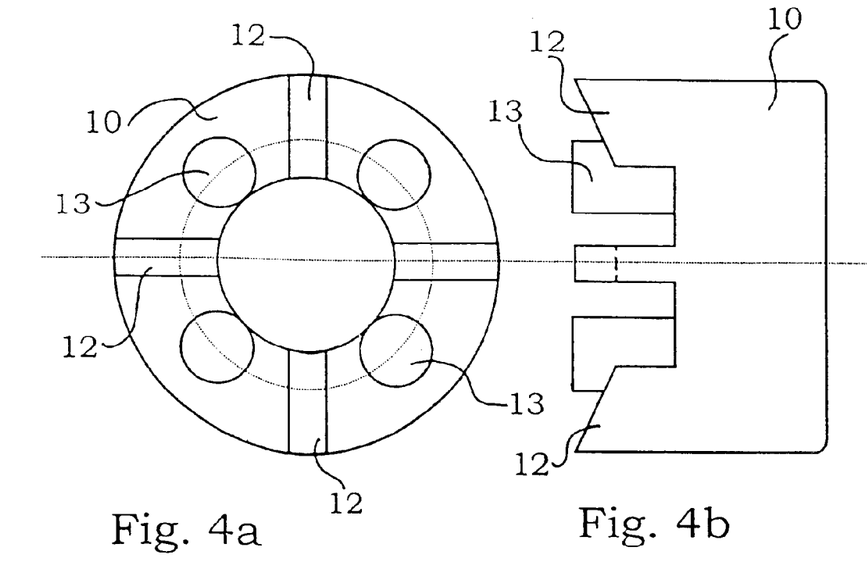
FIGS. 4a and 4b are an end view and a side view of a second broaching tool for a simplified manufacturing method according to the present invention.

The FIGS. 4a and 4b illustrate an alternative broaching tool 10 that may also be used to manufacture a wheel bearing assembly according to the first exemplary embodiment, but that advantageously simplifies the manufacturing method. In principle, the structure of this alternative broaching tool 10 corresponds to that of the broaching tool shown in the FIGS. 3a and 3b. In addition to the machining teeth 12, it is however provided with additional punches 13 which are symmetrically arranged as well and are offset relative to the machining teeth 12. Said punches 13 are arranged in such a manner that they can be placed directly onto the outer ring 3, but not onto the inner ring 2 of bearing 1. This cannot be seen directly in the Figures (see FIGS. 5a and 5b) since the punches 13 are offset from the viewing plane (sectional plane A—A).

Figure 5A:
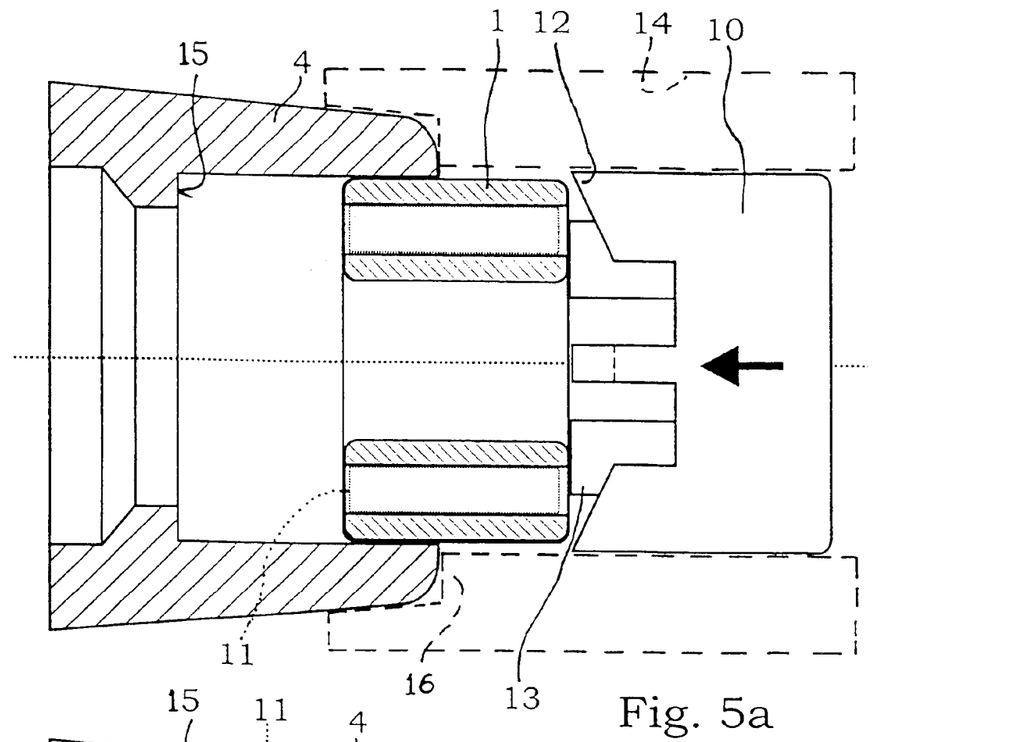
FIGS. 5a and 5b show method steps for manufacturing the wheel bearing assembly by means of the broaching tool of FIGS. 4a and 4b.
Figure 5B:
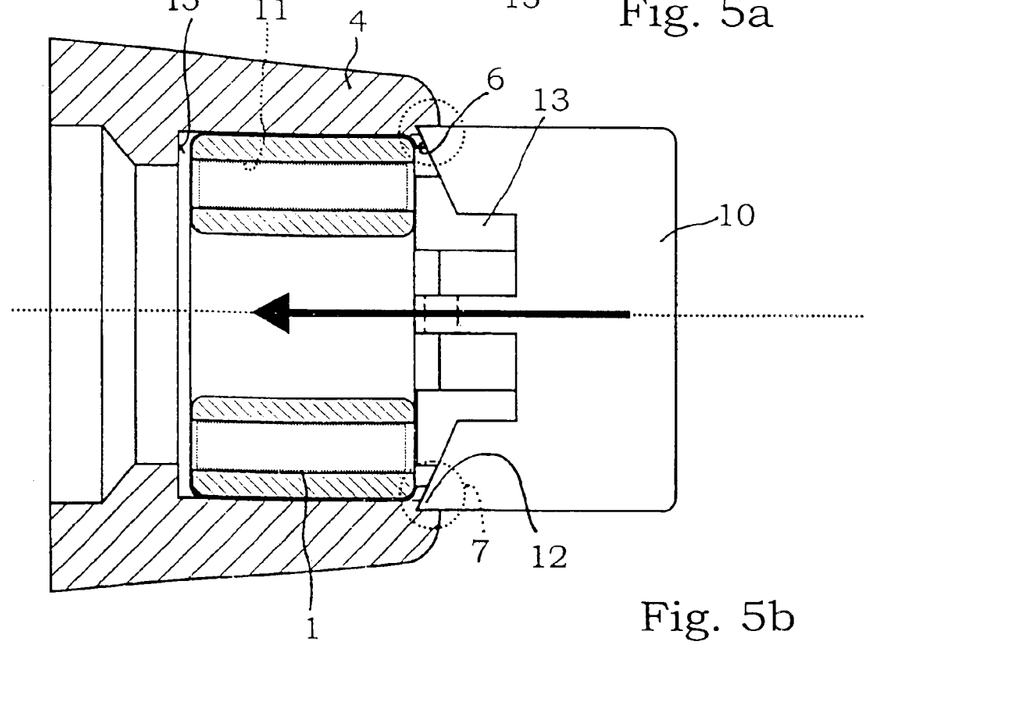

The FIGS. 5a and 5b illustrate this simplified method for manufacturing a wheel bearing assembly. In a first method step, the bearing 1 is placed onto a front face of the bearing casing 4 and is pressed into said bearing casing, i.e., it is pushed in axial direction into the interior of bearing casing 4 until it abuts on the shoulder 5. For this purpose, the inner surface of bearing casing 4 is advantageously machined down, for example, in such a manner that a suitable fit is provided between the outer ring 3 of bearing 1 and the inner surface of bearing casing 4.

A broaching tool 10 composed of two or several parts can also be utilized instead of a broaching tool 10 operating in one piece. In this tool, the parts that press the outer ring 3 (the punches, for example) are arranged on an interior portion of the broaching tool. The interior portion is slidably guided in axial direction in an exterior portion of the broaching tool. The exterior portion is provided with the machining teeth 12. At first, the bearing 1 is pressed in via its outer ring 3 by means of the punches 13 of said broaching tool composed of two parts. Next, plastic forming is carried out by means of the machining teeth 12.

A guide member 14 is shown in a dashed line in FIG. 5a. It may not be provided, but it is advantageous. It has a stop protrusion 16 (on the left side in FIG. 5a) by which it rests on the bearing casing 4 in an axial orientation. It has an interior space in which the broaching tool 10 is slidably guided in axial direction. In this way it is made certain that the broaching tool is moved along the axis of the bearing casing 4. The guide member 14 may alternatively be a mandrel that fills an inner bore of the broaching tool 10 and axially guides the latter. The mandrel is precisely retained in axial direction in the bearing casing 4 or in the inner ring for example.

The latter method steps in accordance with the invention can now be carried out simultaneously or subsequently by means of the alternative broaching tool 10 described herein above. For this purpose, the broaching tool 10 shown in the FIGS. 4a and 4b is placed onto the free side face of bearing 1, as can be surveyed from FIG. 5a. Then, broaching tool 10 is pushed in axial direction toward bearing casing 4, the bearing casing 4 being retained. Bearing 1 is concurrently pushed in axial direction into the interior of bearing casing 4 while bearing casing 4 is plastically formed, as shown in FIG. 2b, in the same working cycle. FIG. 5b shows an intermediate stage of this machining step, in which bearing 1 has not yet abutted on the supporting surface 15. The stop protrusions 6 have not yet reached the size they have in FIG. 2b. The simplified manufacturing method is completed when bearing 1 abuts with its outer ring 3 on the supporting surface 15. Then, the broaching tool 10 can be removed and the wheel bearing assembly of the invention is ready to be mounted.

Particular advantages are achieved when, during the press-in procedure, i.e., while the bearing 1 is being axially displaced into the interior of bearing casing 4 by the pressure exerted onto outer ring 3, the force needed for axial displacement thereof is measured. When bearing 1 abuts with its outer ring 3 on supporting surface 5, the displacing force will strongly increase, which can be reliably used as a criterion to complete the machining procedure.

In addition to considerably simplifying the method for manufacturing a wheel bearing assembly of the invention, the use of the alternative broaching tool has the further advantage that the depth of engagement of the machining teeth 12 must not be ascertained separately. By contrast, this is necessary when using a broaching tool according to the FIGS. 3a and 3b in order to prevent outer ring 3 of bearing 1 from being subjected to too strong a mechanical load due to the plastic forming process of the bearing casing and the configuration of the stop protrusions 6.

The alternative broaching tool 10 with its punches 13 permits the determining of the axial spacing between the machining teeth 12 of broaching tool 10 and the outer ring of bearing 1. If the abutment of outer ring 3 on support 5 is ascertained, by means of other measures, the geometrical configuration of broaching tool 10 already permits to ensure the realization of the stop protrusions 6, the mechanical properties of which have remained unchanged throughout the process and which are substantially defined by the relative position of the machining teeth 12 and the punches 13.

Figure 6A:
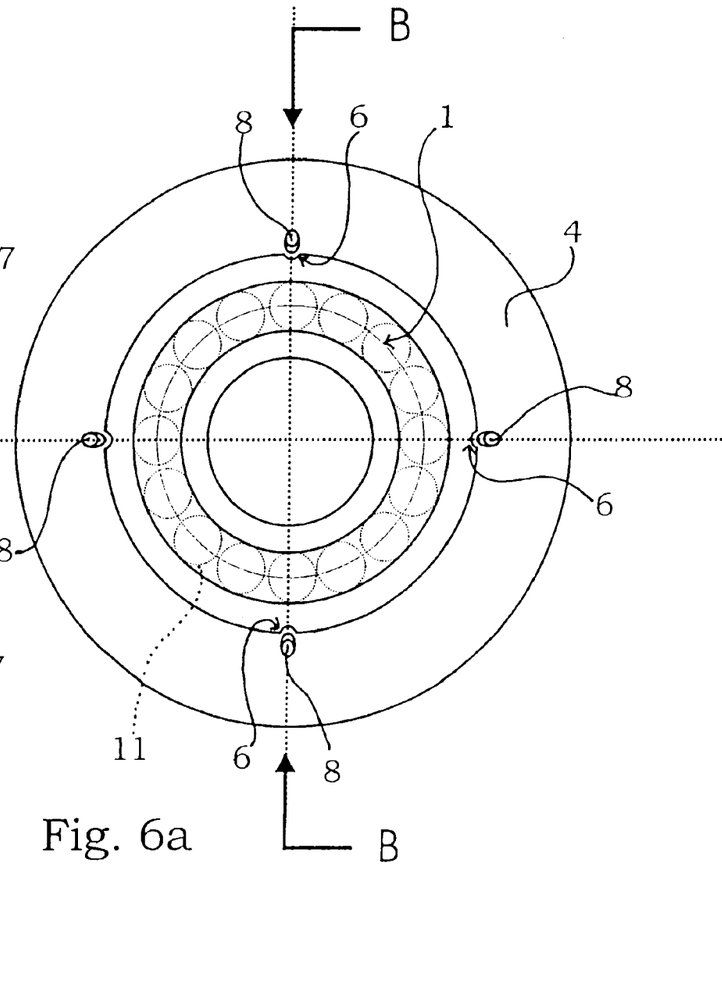
FIG. 6a is an end view of a second embodiment of a wheel bearing assembly according to the principles of the present invention.
Figure 6B:
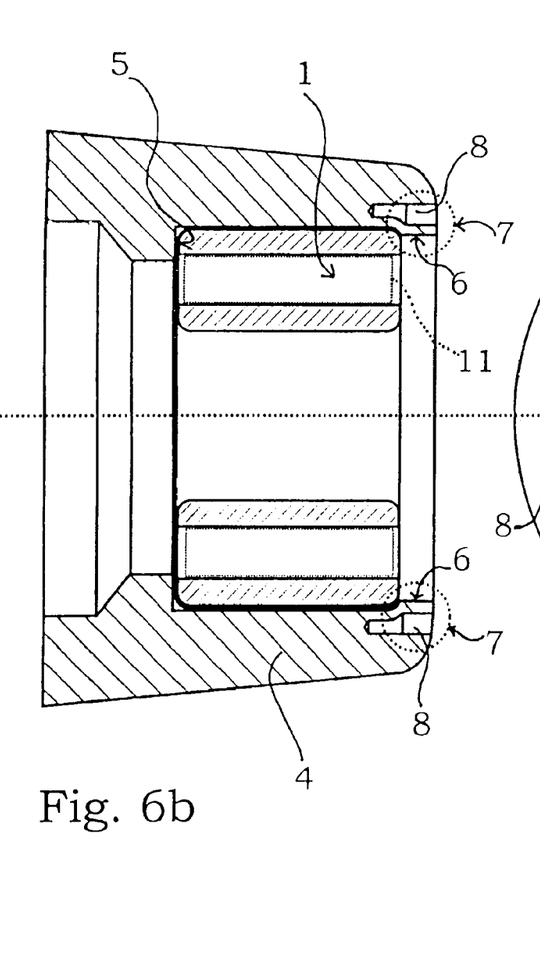
FIG. 6b is a sectional view taken along line B—B (FIG. 6a) through the second embodiment of the wheel bearing assembly.

In an alternative embodiment of the method of the invention, bores are produced in the bearing casing 4 that are oriented in axial direction and arranged evenly on a circumference whose center coincides with the center of the rotational symmetrical bearing casing 4. Said bores 8 advantageously have such a depth that they overlap with the bearing 1 once fitted in the bearing casing 4 and as shown in FIG. 6b. In order to achieve secure fixation of bearing 1 in bearing casing 4, three bores at least are produced in the bearing casing 4. Any other number and arrangement of bores 8 in bearing casing 4 is possible as long as it makes sense technically. The bores 8 themselves can be produced both before or after the bearing 1 is fit into casing 4.

Figure 7A:
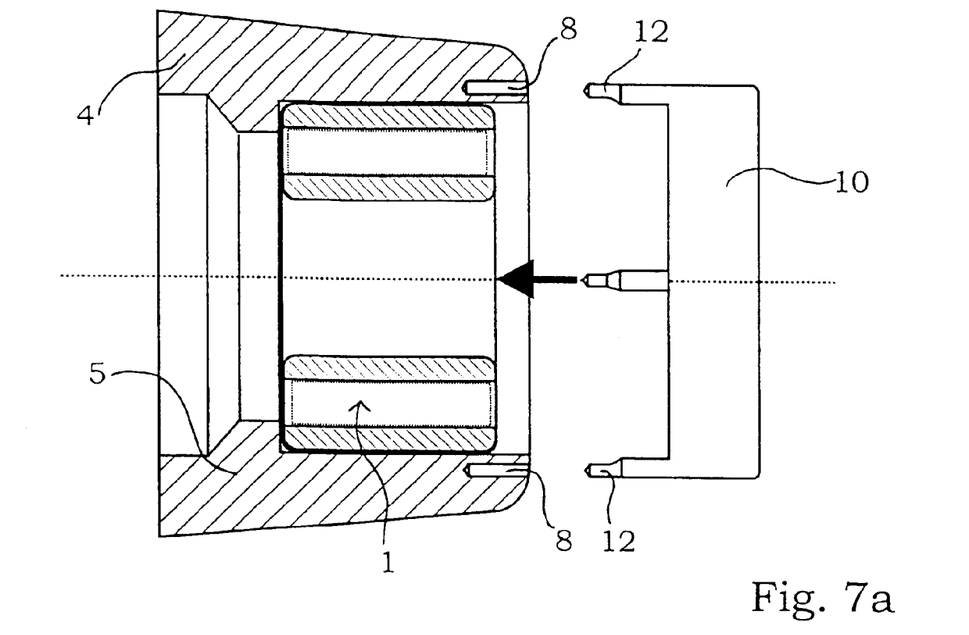
FIGS. 7a and 7b are sectional views like FIG. 6b of the wheel bearing assembly and a side view of a broaching tool and serve to explain the method steps for manufacturing the second embodiment of the wheel bearing assembly.
Figure 7B:
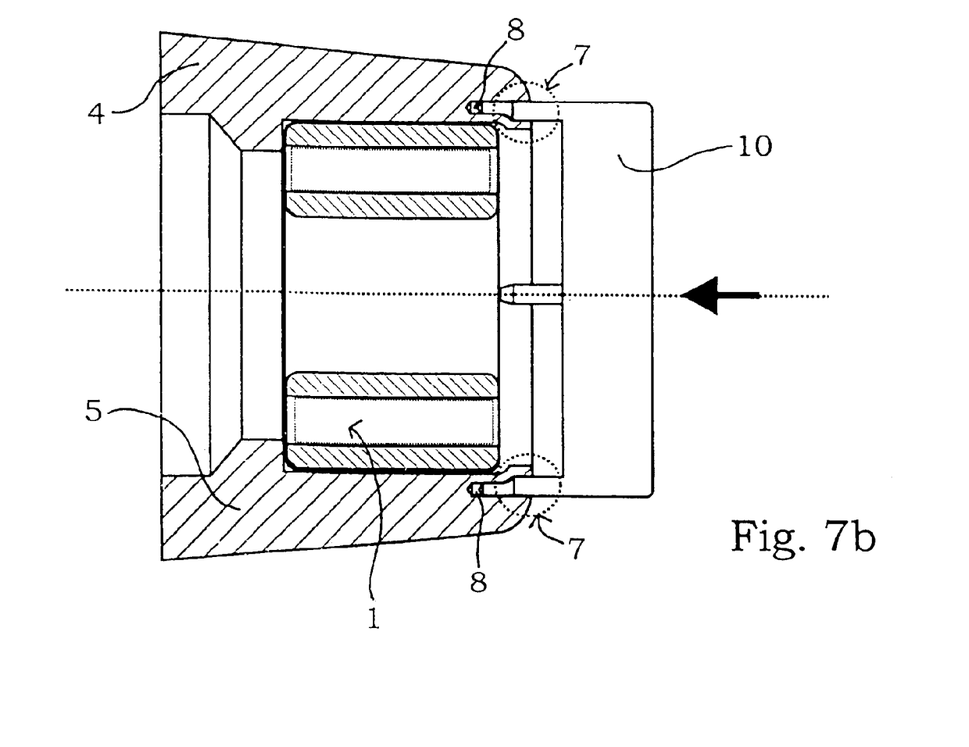

Once bearing 1 has been pushed in axial direction into the bearing casing 4 and abuts on the supporting surface 15, the bearing 1 is fixed by means of plastic forming the bearing casing 4 in the region of the bores 8. For this purpose, a machining tooth 12 of a broaching tool engages into each of the bores 8 and plastically deforms the material of the bore's 8 wall toward the center axis of bearing casing 4 at least in radial direction. The corresponding method steps can be surveyed from the FIGS. 7a and 7b. FIG. 7b illustrates an intermediate state in which the wall has already in parts undergone plastic deformation. The final state of the wheel bearing assembly, which is now ready to be mounted, is shown in FIG. 6b.

In this machining process, the special configuration of the machining tooth/teeth 12 of the broaching tool 10 permits to ensure that the bearing casing 4 does not deform substantially in the region in which the bores 8 and the bearing 1 overlap, plastic forming the bearing casing 4 being only performed in the region located axially beyond the end of bearing 1. For this purpose, the machining teeth 12 of broaching tool 10 are provided, at their tips, with a circular cross-section which is adapted to the inner diameter of the bores 8. As the distance from the tip increases, this circular cross-section continuously changes over a certain length into an elliptical cross-section, as can be surveyed from the FIGS. 7a and 7b.

If the depth at which the broaching tools 10 are introduced into the bores 8 is ascertained by appropriate measures, it can be made certain that, thanks to the described configuration of the machining teeth 12 of the broaching tool 10, outer ring 3 is prevented from being subjected to excess mechanical load since the bearing casing 4 is only machine-shaped axially beyond the outer ring 3.

In a way analogous to the broaching tool 10 shown in the FIGS. 3a and 3b, it is also advantageous in the present case to use a broaching tool 10 provided with several machining teeth 12 for concurrently engaging into the bores 8 so that the bearing casing 4 is locally machine-shaped substantially simultaneously in the region of all of the bores 8. The bores 8 may of course also be processed sequentially.

In this exemplary embodiment it is also possible to combine the method steps displacing the bearing and fixing the outer ring into one single method step. Like in the previous exemplary embodiment, this is achieved using a specially configured broaching tool 10 provided, in addition to the teeth for engagement into the bores 8, with several punches 13 that are intended to abut on a side face of bearing 1. In this way, axial movement of broaching tool 10 causes the bearing 1 to be pushed into bearing casing 4 in axial direction while the bores 8 are efficiently machine-shaped to form the stop protrusions 6.

Figures 8A, 8B:
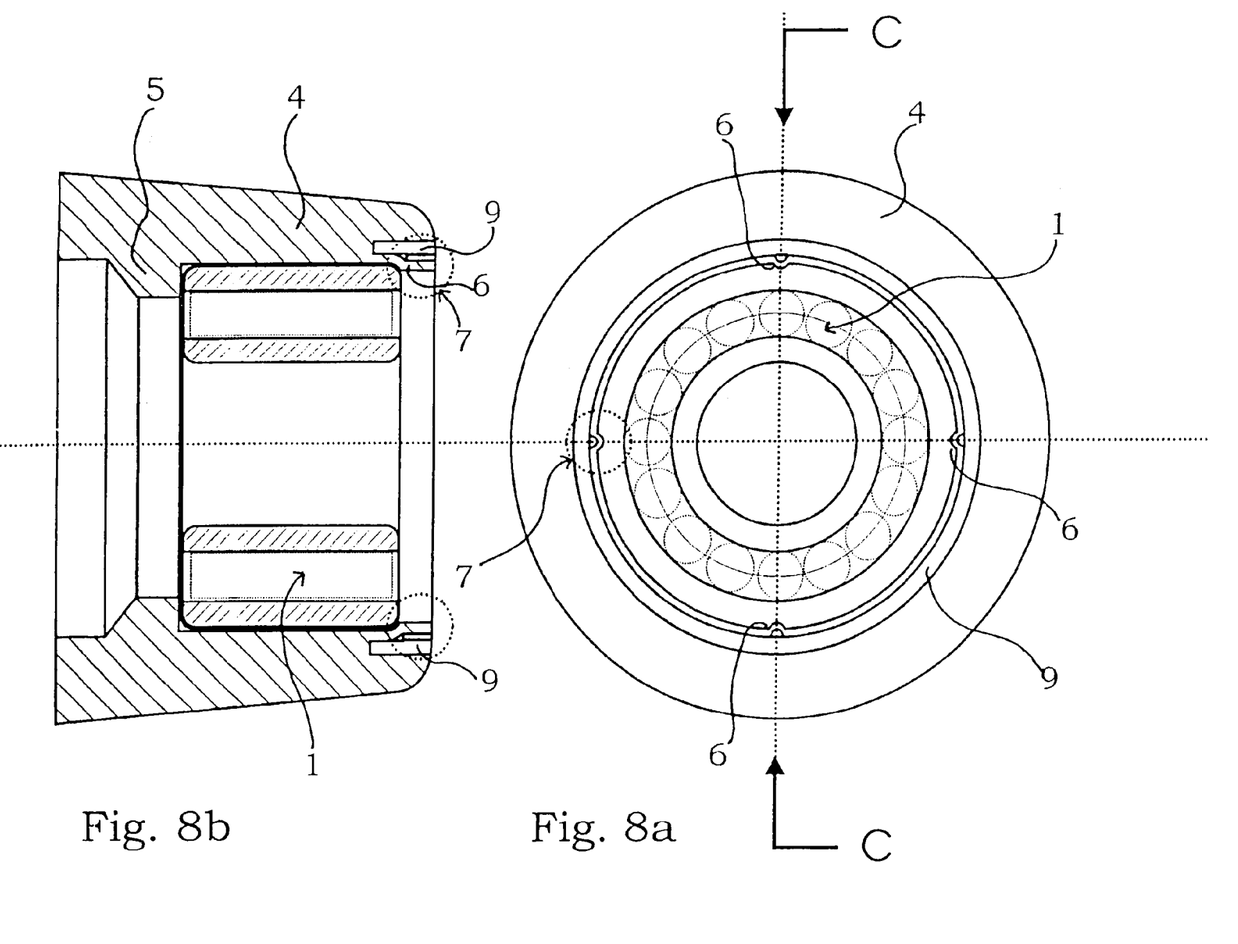
FIG. 8a is an end view of a third embodiment of a wheel bearing assembly.
FIG. 8b is a sectional view taken along line C—C (FIG. 8a) through the third embodiment of a wheel bearing assembly.

Referring now to FIGS. 8a and 8b, as an alternative to producing a plurality of bores 8 in bearing casing 4, a ring-shaped hole or annular groove 9 may be pierced into the bearing casing, said hole extending in axial direction and enclosing the inner circumference of the bearing casing. The depth of the hole is advantageously analogous to the depth of the bores 8 in the previous exemplary embodiment. To fixate bearing 1 in bearing casing 4, one or several broaching tools 10 are engaged into hole 9 and machine locally the inner wall between the inner circumference of bearing casing 4 and hole 9, the stop protrusions 6 being realized in the process. For this purpose the broaching tool 10 may be provided with one or several machining teeth 12 that are configured analogous to the machining teeth 12 of the previous exemplary embodiment. Furthermore, all of the explanations given there with reference to advantageously configured broaching tools 10 with several machining teeth 12, and alternatively with punches 13, directly apply to this embodiment. In this embodiment it is further possible to annularly broach the annular hole 19 360 degrees about the casing 14 so that a closed stop protrusion 6 extends around the entire circumference.

In a last exemplary embodiment, the stop protrusions 6 are formed on the inner circumference of bearing casing 4 by embossing the bearing casing, only without previously piercing a hole or removing metal. For this purpose, the inner diameter of the bearing casing is locally reduced by embossing in the region of the second side of the outer ring 3 of the bearing on the front face turned away from the support 5. The embossing procedure (carried out by means of conical embossing teeth for example) causes the bearing casing 4 to plastically deform in such a manner that the stop protrusions 6 are being formed without the force acting on the outer ring 3 of the bearing being increased.

The methods herein described for axially fixating bearing 1 in bearing casing 4 directly apply to fixating the inner ring 2 of bearing 1 to a member, such as a shaft extended therethrough. For this purpose, the shaft is fitted into inner ring 2 until a supporting surface of any kind configured on the shaft abuts on a first side of inner ring 2. Then, the shaft is subjected to plastic forming in the region of the outer circumference thereof on the second side of inner ring 2, a plurality of stop protrusions being formed in the process, said stop protrusions cooperating with supporting surface to fixate the shaft in axial direction within inner ring. This manufacturing method and the wheel bearing assemblies manufactured using said method are also subject matter of the present application.

What is claim is:

1. A method of manufacturing a wheel bearing assembly for motor vehicles involving the following method steps:
    a) fitting a bearing having an outer ring into a bearing casing;
    b) providing a broaching tool having a plurality of protrusions for abutment on a front face of the bearing;
    c) displacing said bearing in an axial direction with the protrusions of the broaching tool until the outer ring abuts on a supporting surface of the bearing casing;
    d) fixing the outer ring in said bearing casing axially and non-rotationally by machine-shaping the bearing casing causing localized plastic deformation and forming a plurality of localized, spaced-apart stop protrusions on an inner circumference of said bearing casing, the stop protrusions cooperating with the supporting surface to fixate the outer ring in the axial direction within the bearing casing,
    wherein
    e) machine-shaping is carried out during the axial displacement of the bearing and is completed when the outer ring of the bearing abuts on the supporting surface.

2. The method according to claim 1, wherein a force of the axial displacement is measured during the method steps b) and c).

3. The method according to claim 1, wherein the axial displacement of the bearing and machine-shaping are performed by means of the broaching tool.

4. The method according to claim 1, wherein all of the stop protrusions are realized substantially simultaneously during the machine-shaping process.

5. The method according to claim 1, wherein, during the machine-shaping process, the bearing casing and the broaching tool execute a relative motion which is substantially a motion of translation only.

6. The method according to claim 1, wherein, during the machine-shaping process carried out by the broaching tool, material of the bearing casing is displaced, on at least 3 discrete machining areas distributed over the inner circumference of the bearing casing, in the axial direction, which results in locally plastically forming the bearing casing in the axial and a radial direction, and in the realization of the stop protrusions.

7. The method according to claim 1, wherein, for carrying out the machine-shaping process,
    a) at least 3 bores are realized within the bearing casing, said bores being located on a common circumference adjacent the inner circumference of the casing and extending in the axial direction, and
    b) material of the bearing casing is locally displaced in the axial direction by means of the broaching tool engaging into the bores, thus forming the stop protrusions.

8. The method according to claim 1, wherein, for carrying out the machine-shaping process,
    a) at least one annular ring-shaped groove enclosing the inner circumference of the bearing casing and extending in the axial direction is pierced into the bearing casing, and
    b) material of the bearing casing is locally displaced in a radial direction in at least 3 discrete machining areas distributed over the at least one ring-shaped groove by the broaching tool engaging in the at least one ring-shaped groove, thus forming the stop protrusions.

9. A broaching tool for pressing into and fastening in a wheel bearing assembly a bearing, said tool comprising:
    a) a plurality of protrusions for abutment on a front face of a bearing for axially sliding the bearing into a bearing casing, and
    b) a plurality of forming tools adapted to plastically deform the bearing casing during axial only movement in such a manner that the inner diameter of the bearing casing is locally reduced by plastic deformation so that a plurality of stop protrusions are formed on an inner circumference of the bearing casing,
    to fixate the front face of the bearing in the axial direction within the bearing casing; wherein the protrusions and forming tools are configured such that deformation is carried out during the axial displacement of the bearing and is completed when the back face of the bearing abuts on a supporting surface in the bearing casing.

10. The broaching tool according to claim 9, wherein the protrusions are configured in such a manner that they only abut on the outer ring of the bearing.

11. The broaching tool according to claim 9, wherein the broaching tool forms an inner and an outer portion,
    a) the inner portion being concentrically slidable in the axial direction within the outer portion, and
    b) the protrusions are formed on one of the inner portion and outer portion and the forming tools are formed on the other of the inner portion and the outer portion.

12. The broaching tool according to claim 9, wherein the broaching tool is provided with a guide member that allows the broaching tool to move along the axis of the bearing only.

13. A method of manufacturing a wheel bearing assembly for motor vehicles involving the following method steps:
    a) fitting a bearing having an outer ring into a bearing casing having an inner surface surrounding said bearing, the bearing casing defining at least one previously-formed bore radially spaced from the inner surface,
    b) displacing said bearing in an axial direction until the outer ring abuts on a supporting surface of the bearing casing;
    c) fixing the outer ring in said bearing casing by axially and non-rotationally plastically deforming said at least one bore in order to form at least one stop protrusion on the inner circumference of said bearing casing, the at least one stop protrusion cooperating with the supporting surface to fixate the outer ring in the axial direction within the bearing casing, wherein d) machine-shaping is carried out during the axial displacement of the bearing and is completed when the outer ring of the bearing abuts on the supporting surface.

14. The method according to claim 13, wherein the at least one bore of the bearing casing includes a plurality of bores located on a common circumference adjacent the inner circumference of the bearing casing.

15. The method according to claim 13, wherein the at least one bore includes a ring-shaped annular groove located adjacent to the inner circumference of the bearing casing.

16. The method according to claim 13, further comprising:

a) providing a broaching tool having at least one protrusion for abutment on a front face of the bearing; and b) displacing the bearing in an axial direction with the at least one protrusion of the broaching tool until the outer ring abuts on a supporting surface of the bearing casing.

17. The method according to claim 16, wherein the at least one protrusion includes a plurality of protrusions.

* * * * *